United States Patent
Albrecht et al.

(10) Patent No.: US 10,855,649 B2
(45) Date of Patent: Dec. 1, 2020

(54) CONTROL COMPONENT AND METHOD FOR REGISTERING DEVICE NAMES ASSIGNED TO INDUSTRIAL AUTOMATION DEVICES OR COMMUNICATION DEVICES IN A NAME SERVICE SYSTEM

(71) Applicant: Siemens Aktiengesellschaft, Munich (DE)

(72) Inventors: Harald Albrecht, Nuremberg (DE); Stephan Höme, Schwabach (DE); Thomas Talanis, Heroldsbach (DE)

(73) Assignee: Siemens Aktiengesellschaft, Munich (DE)

( * ) Notice: Subject to any disclaimer, the term of this patent is extended or adjusted under 35 U.S.C. 154(b) by 37 days.

(21) Appl. No.: 16/397,716

(22) Filed: Apr. 29, 2019

(65) Prior Publication Data
US 2019/0334860 A1    Oct. 31, 2019

(30) Foreign Application Priority Data

Apr. 30, 2018   (EP) .................................. 18170056

(51) Int. Cl.
    *H04L 29/12*   (2006.01)
    *G05B 19/418*  (2006.01)
(52) U.S. Cl.
    CPC ...... *H04L 61/2076* (2013.01); *G05B 19/4185* (2013.01); *H04L 61/1511* (2013.01); *H04L 61/2015* (2013.01); *G05B 2219/31335* (2013.01)
(58) Field of Classification Search
    None
    See application file for complete search history.

(56) References Cited

U.S. PATENT DOCUMENTS

| | | | |
|---|---|---|---|
| 2016/0171048 A1* | 6/2016 | Idei ..................... | G06F 12/0862 707/718 |
| 2016/0241511 A1 | 8/2016 | Albrecht | |
| 2016/0330168 A1 | 11/2016 | Albrecht et al. | |

FOREIGN PATENT DOCUMENTS

| | | |
|---|---|---|
| EP | 2975477 | 1/2016 |
| EP | 2966311 | 3/2016 |

(Continued)

OTHER PUBLICATIONS

Stapp Cisco Systems Met AL: "A DNS Resource Record (RR) for Encoding Dynamic Host Configuration Protoco I (DHCP) Information (DHCID RR); rfc4701.txt", A DNS Resource Record (RR) for Encoding Dynamic Host Configuration Protocol (DHCP) Information (DHCID RR)?; FC4701.txt, Internet Engineering Task Force, IETF;Standard, Internet Society (ISOC) 4, Rue Des Falaises CH-1205 Geneva, Switzerland, XP015048673, Abstract, paragraph [0001], [0005]; 2006.

*Primary Examiner* — Natisha D Cox
(74) *Attorney, Agent, or Firm* — Cozen O'Connor

(57) ABSTRACT

Control component and method for registering device names assigned to industrial automation devices or communication devices in a name service system, wherein in order to register device names assigned to industrial automation devices or communication devices in a name service system, at least selected automation or communication devices each comprise a name service component where the selected automation or communication devices control transmission of a registration request containing an assignment between their respectively assigned device name and at least one respectively configured communication network address to a name service server via their name service component, and where a control component is respectively assigned to the name service components and enables or blocks transmission of a registration request.

18 Claims, 2 Drawing Sheets

(56) References Cited

FOREIGN PATENT DOCUMENTS

| EP | 3041199 | 7/2016 |
| EP | 3059930 | 8/2016 |
| EP | 3091714 | 11/2016 |

* cited by examiner

CONTROL COMPONENT AND METHOD FOR REGISTERING DEVICE NAMES ASSIGNED TO INDUSTRIAL AUTOMATION DEVICES OR COMMUNICATION DEVICES IN A NAME SERVICE SYSTEM

BACKGROUND OF THE INVENTION

1. Field of the Invention

The invention relates to industrial automation systems and, more particularly, to a control component and method for registering device names assigned to industrial automation devices or communication devices in a name service system,

2. Description of the Related Art

Industrial automation systems are used to monitor, control and regulate technical processes, particularly in the field of manufacturing, process and building automation, and make it possible to operate control devices, sensors, machines and technical installations in a substantially independent manner. An important basis for reliably providing monitoring, control and regulation functions via a process automation system involves completely and correctly capturing and mapping components of the industrial process automation system in an engineering or project planning system.

Interruptions in communication connections between computer units of an industrial automation system or automation devices may result in undesirable or unnecessary repetition of the transmission of a service request. In addition, un-transmitted messages or incompletely transmitted messages may prevent an industrial automation system from changing to or remaining in a safe operating state, for example. This may finally result in failure of a complete production installation and costly production downtime. A particular problem regularly results in industrial automation systems from message traffic with a comparatively large number of, but relatively short, messages, thus intensifying the above problems.

EP 2 975 477 A1 describes a method for registering device names from an industrial automation system in a communication network name service, in which those communication devices of the industrial automation system for which it is permitted or necessary to register their respective device name in the communication network name service are determined in a device-specific manner via a rule base. Communication network addresses of communication devices are reported to a central name service agent of the industrial automation system via decentralized name service agents for the devices. In the case of a name/address assignment to be registered, the central name service agent transmits a registration request comprising the name/address assignment to the communication network name service. Within the industrial automation system, only the central name service agent can transmit registration requests to the communication network name service for processing.

EP 2 996 311 A1 discloses a method for providing information relating to communication device names within an industrial automation system, in which, if a device name of a communication device is allocated or changed, a datagram containing an update request for assigning its communication network address to the changed or allocated device name is then distributed, in particular, to selected communication devices. In response to the update request, the selected communication devices each generate or change a data record assigned to the communication device having the changed or allocated device name in their respective database. Here, the data record comprises the assignment of the communication network address to the device name.

EP 3 041 199 A1 describes a method for determining communication device addresses within a communication network of an industrial automation system, in which a storage unit is respectively assigned to selected communication devices of the industrial automation system and respectively temporarily stores at least some name service information provided by a communication network name service. A connection set-up from a first selected communication device to a second communication device is started, in the case of an application or function of the industrial automation system that is distributed among at least the first and second communication devices, based on the name service information stored in the storage unit assigned to the first communication device. In the event of a failed attempt to set up a connection, the application or function triggers at least partial updating of the temporarily stored name service information.

EP 3 059 930 A1 discloses a method for configuring a communication device of an industrial automation system, in which a communication network address assigned to the communication device is independently generated from at least one prefix transmitted via router notification messages and from a device-specific interface identifier. The router notification messages are transmitted by at least one router assigned within a subnetwork. The communication device asks at least one server of a name service system, in accordance with a name resolution protocol, which communication network addresses are assigned to its communication device name. The communication network addresses requested from the server of the name service system are checked for correspondence with the prefix. The communication device assigns only those communication network addresses requested from the server of the name service system that correspond to the prefix transmitted by the router.

EP 3 091714 B1 discloses the fact that communication devices of an industrial automation system each check, via a name service component, whether a device name having a topological or hierarchical name component, which substantially completely denotes a spatial or hierarchical arrangement of the respective communication device, is assigned to the respective communication device. In the event of a positive checking result, the communication devices each treat their assigned device name as a complete device name. In the event of a negative checking result, the communication devices each independently generate their complete device name from topological or hierarchical name components distributed via messages with router notifications and a name component that is unique within their respective subnetwork.

In industrial automation systems, automation or communication devices are preferably addressed using device names instead of using communication network addresses. For this reason, high importance is attached to identifying multiply assigned identical device names and to avoiding name conflicts in a Domain Name System (DNS).

When using DHCP Dynamic Host Configuration Protocol (DHCP) or Dynamic Host Configuration Protocol for Internet Protocol Version 6 (DHCPv6), name conflicts can be fundamentally identified by a DHCP or DHCPv6 server according to the Internet Engineering Task Force (IETF), Request for Comments (RFC) 4701 and 4703. However, this applies only when exactly one DHCP or DHCPv6 server is responsible for DNS registrations for each automation or communication device. Accordingly, name conflicts can arise as soon as a plurality of DHCP or DHCPv6 servers are used at the same time or DNS clients are used for DNS registrations for the devices.

In addition, a device replacement, i.e., a replacement of a previously used device with a replacement device, results in a changed device identity in accordance with IETF RFC 4701 and 4703. This makes it difficult to replace a device while retaining the name because a previously used device and a replacement device are fundamentally treated as different devices according to IETF RFC 4701 and 4703.

SUMMARY OF THE INVENTION

It is an object of the present invention to provide an apparatus and a method for registering device names assigned to industrial automation devices or communication devices in a name service system, which method makes it possible to reliably identify name conflicts and supports a device replacement while retaining the name.

This and other objects and advantages are achieved in accordance with the invention by a control component having a processor and memory and by a method for registering device names assigned to industrial automation devices or communication devices in a name service system comprising at least one name service server that provides information relating to assignments between device names and communication network addresses in accordance with a name resolution protocol, where at least selected automation or communication devices each comprise a name service component and, via their name service component, control transmission of a registration request containing an assignment between their respectively assigned device name and at least one respectively configured communication network address to the name service server, and where a control component is respectively assigned to the name service components and enables or blocks transmission of a registration request.

In accordance with the method of the invention for registering device names assigned to industrial automation devices or communication devices in a name service system, in particular a Domain Name System (DNS), the name service system comprises at least one name service server that provides information relating to assignments between device names and communication network addresses in accordance with a name resolution protocol. The name service server preferably provides information relating to assignments between device names and communication network addresses according to IETF RFC 1034 and IETF RFC 1035. The device names may be Fully Qualified Domain Names (FQDN), for example.

In accordance with the invention, at least selected automation or communication devices each comprise a name service component, in particular a DNS Update Client. With their name service component, the selected automation or communication devices each control transmission of a registration request containing an assignment between their respectively assigned device name and at least one respectively configured communication network address to the name service server. The registration requests may be DNS Update Requests, for example.

In accordance with the invention, a control component is respectively assigned to the name service components and enables or blocks transmission of a registration request. Before enabling or blocking a registration request for a selected automation or communication device, the control components each query which device configuration identifier is assigned to the device name of the respective selected automation or communication device in the name service system. The device configuration identifiers are advantageously generated within an address, name or name service configuration of a selected automation or communication device and may be, for example, Dynamic Host Configuration Identifiers (DHCID) according to IETF RFC 4701.

In accordance with the invention, if an assignment exists, then the control components each check whether the device configuration identifier assigned to the device name of the respective selected automation or communication device in the name service system corresponds to a device configuration identifier assigned to the respective selected automation or communication device. If an assignment of a device configuration identifier is missing and/or in the event of a positive checking result, the control components each enable transmission of the registration request. In contrast, in the event of a negative checking result, then the control components each block transmission of the registration request based on a reachability check for at least one communication network address assigned to the respective device name in the name service system. In this manner, suitable measures for providing consistent DNS information can be initiated depending on the application (initial start-up, device replacement, address change/device relocation or multiple allocation of identical names).

In accordance with one preferred embodiment of the present invention, if an automation or communication device having the communication network address assigned to the respective device name can be reached, then the control components each block transmission of the registration request. In addition, if an automation or communication device having the communication network address assigned to the respective device name can be reached, then the control components can each signal a warning of a multiply assigned device name, for example. In accordance with another advantageous embodiment, if an automation or communication device having the communication network address assigned to the respective device name cannot be reached, then the control components each enable transmission of the registration request. Name retention can therefore be reliably supported if a device is replaced. The reachability check is advantageously performed via an echo request in accordance with the Internet Control Message Protocol (ICMP) and/or the Internet Control Message Protocol for the Internet Protocol Version 6 (ICMPv6).

If an assignment of a device configuration identifier is missing, registration of the assignment between the device name and the communication network address of the respective automation or communication device in the name service system is prompted via the registration request, in particular. Suitable measures for providing consistent DNS information are therefore implemented for initial start-up. In accordance with another advantageous embodiment of the present invention, a) in the event of a positive checking result and/or b) if an automation or communication device having the communication network address assigned to the respective device name cannot be reached, then registration of at least one updated communication network address of the respective automation or communication device in the name service system is prompted via the registration request. In this manner, suitable measures for providing consistent DNS information are implemented a) for an address change and b) for a device replacement.

The name service components can each comprise, for example, a DNS Update Client or a name service client for dynamic DNS, with the result that the selected automation or communication devices can each transmit registration requests via their name service client for dynamic DNS. In accordance with another advantageous embodiment of the present invention, a configuration server for address, name and/or name service configuration, in particular a DHCP or DHCPv6 server, is respectively assigned to the selected automation or communication devices. Here, registration requests for the selected automation or communication devices are respectively transmitted via the assigned configuration server. In particular, the selected automation or communication devices each advantageously control transmission of a registration request by the assigned configuration server using their name service component. In addition, the selected automation or communication devices may be assigned to an industrial automation or communication system having a plurality of DHCP and/or DHCPv6 servers. In this case, multiplying assigned identical names can be also reliably identified and also suitably handled.

The control component in accordance with the invention is configured to perform the method in accordance with the preceding embodiments and is configured to enable or block transmission of a registration request to a name service server of a name service system, where the transmission is controlled by a name service component of a selected automation or communication device. Here, the registration request comprises an assignment between a device name and at least one configured communication network address of the selected automation or communication device. In addition, the control component is configured to query which device configuration identifier is assigned to the device name of the selected automation or communication device in the name service system before enabling or blocking a registration request for a selected automation or communication device.

In accordance with the disclosed embodiments of the invention, the control component is configured, if an assignment exists, to check whether the device configuration identifier assigned to the device name of the selected automation or communication device in the name service system corresponds to a device configuration identifier assigned to the selected automation or communication device. In addition, the control component is configured, if an assignment of a device configuration identifier is missing and/or in the event of a positive checking result, to enable transmission of the registration request. Furthermore, the control component is configured, in the event of a negative checking result, to block transmission of the registration request based on a reachability check for at least one communication network address assigned to the respective device name in the name service system.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is described in more detail below using an exemplary embodiment on the basis of the drawing, in which.

DETAILED DESCRIPTION OF THE EXEMPLARY EMBODIMENTS

Figure 1:
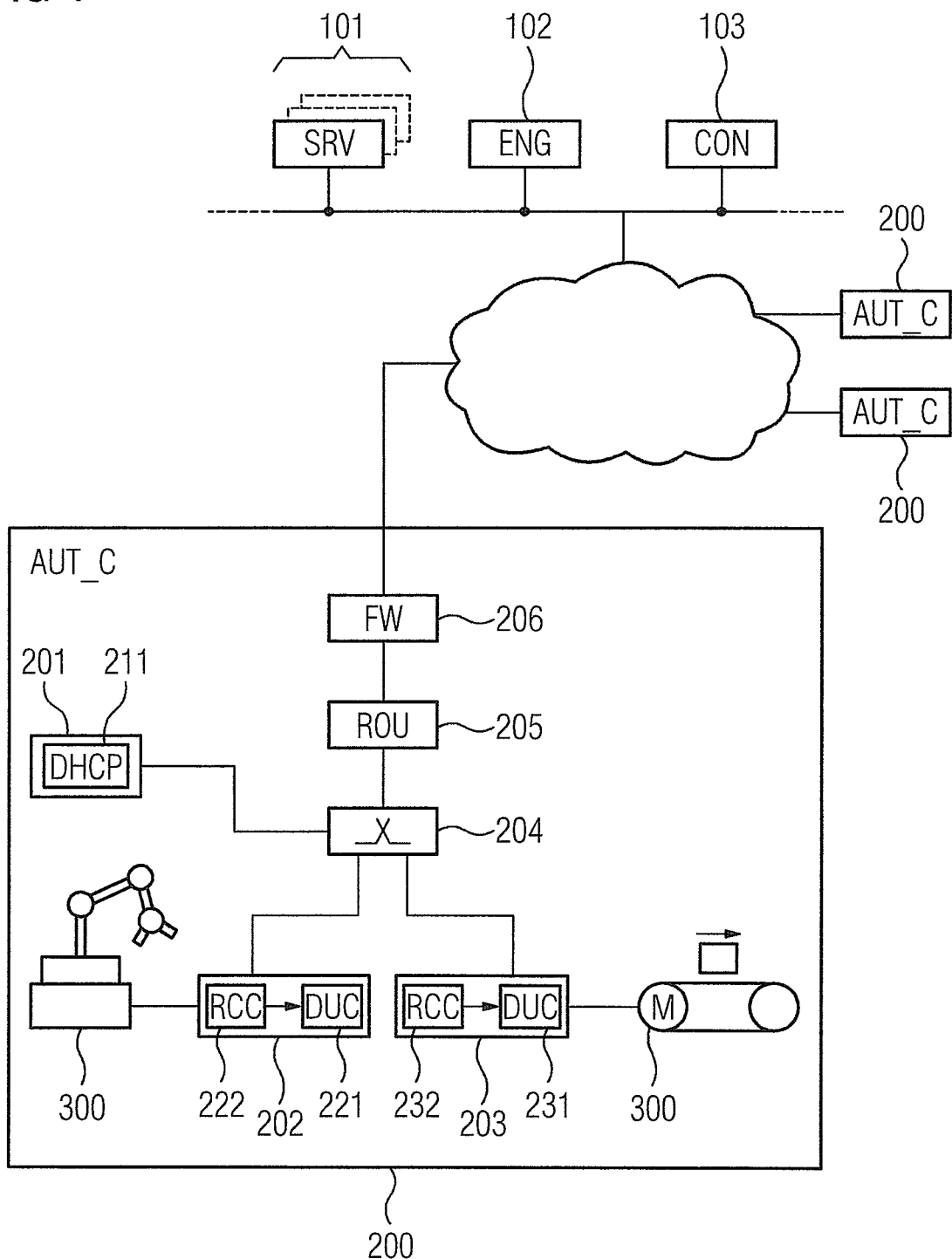
FIG. 1 shows an industrial automation system comprising a plurality of cells in accordance with the invention.

The industrial automation system illustrated in FIG. 1 comprises cells 200 each having a plurality of automation devices 201, 202, 203 that are connected to a switch 204 and, in the present exemplary embodiment, are connected to a cloud computing system 101 via a router 205 assigned to the respective cell 200. Here, a firewall system 206 is preferably connected upstream of the router 205. In principle, both the switch 204 and the firewall system 206 can be integrated in the router 205. The cloud computing system 101 respectively comprises a plurality of server units that provide IT infrastructure, such as storage space, computing power or application software, as a service. In particular, the services provided by the server units may comprise applications or functions for system, process and device monitoring, for device control and configuration, for capturing and analyzing measured values and state information assigned to the automation devices 201, 202, 203, as well as communication and automation functions.

The cells 200 may be connected to the cloud computing system 101 via an IP-based wide area network 104 or via an industrial communication network, for example. In the latter case, an edge or fog computing system, which functionally corresponds substantially to a cloud computing system and has different administrative control in comparison with the latter, takes the place of the cloud computing system 101. In the present exemplary embodiment, the cells 200 are also connected, via the wide area network 104, to an engineering system 102 for planning automation devices, to a control system 103 for monitoring automation devices and to a DNS (Domain Name System) server 104. The DNS server 104 provides, in particular, information relating to assignments between device names and communication network addresses according to IETF RFC 1034 and IETF RFC 1035 for name resolution.

The automation devices 201, 202, 203 may be, for example, operating and observation stations, programmable logic controllers, RFID readers or systems for automatic image processing. In addition to the automation devices 201, 202, 203, network infrastructure devices, such as switches, routers or firewalls, can also be directly or indirectly connected to the router 205 or to the switch 204. These network infrastructure devices are used, in particular, to connect programmable logic controllers, input/output units (I/O modules) or operating and observation stations of the industrial automation system. Input/output units may be in the form of decentralized peripheral modules that are arranged remotely from a programmable logic controller.

Programmable logic controllers usually each comprise a communication module, a central unit and at least one input/output unit. Programmable logic controllers can be connected, for example, to the router 205, to the switch 204 and/or to a field bus via communication modules. Input/output units are used to interchange control and measurement variables between programmable logic controllers and machines or apparatuses 300 controlled by the programmable logic controllers. The central units are provided, in particular, for the purpose of determining suitable control variables from captured measurement variables. The above components of programmable logic controllers are preferably connected to one another via a backplane bus system.

Operating and observation stations are used to visualize process data and measurement and control variables that are processed or captured by programmable logic controllers, input/output units or sensors. In particular, operating and observation stations are used to display values of a control loop and to change control parameters. Operating and observation stations comprise at least a graphical user interface, an input device, a processor unit and a communication module.

The cells 200 of the industrial automation system illustrated in FIG. 1 each comprise an automation device 201 which, as a cell controller, has a DHCP or DHCPv6 server unit 211 for the address, name and/or name service configuration of automation devices 202, 203 within the respective cell 100. A plurality of DHCP or DHCPv6 servers are therefore provided within the industrial automation system.

At least selected automation devices 202, 203 each comprise a DNS Update Client 221, 231. With their DNS Update Client 221, 231, the selected automation devices 202, 203 control transmission of a DNS Update Request containing an assignment between their respectively assigned device name and at least one respectively configured communication network address to the DNS server 104. The device names are preferably assigned in accordance with EP 2 996 311 A1 and EP 3 091 714 B1, the contents of which are expressly incorporated herein by reference in their entirety. In the present exemplary embodiment, the device names are Fully Qualified Domain Names (FQDN) and the selected automation devices 202, 203 each themselves transmit DNS Update Requests using their DNS Update Client 221, 231. In contrast, according to an alternative configuration variant, the DNS Update Requests are each transmitted via the DHCP or DHCPv6 server unit 211. Here, the selected automation devices 202, 203 control transmission of an DNS Update Request by the DHCP or DHCPv6 server unit 211 via their DHS Update Client 221, 231.

Figure 2:
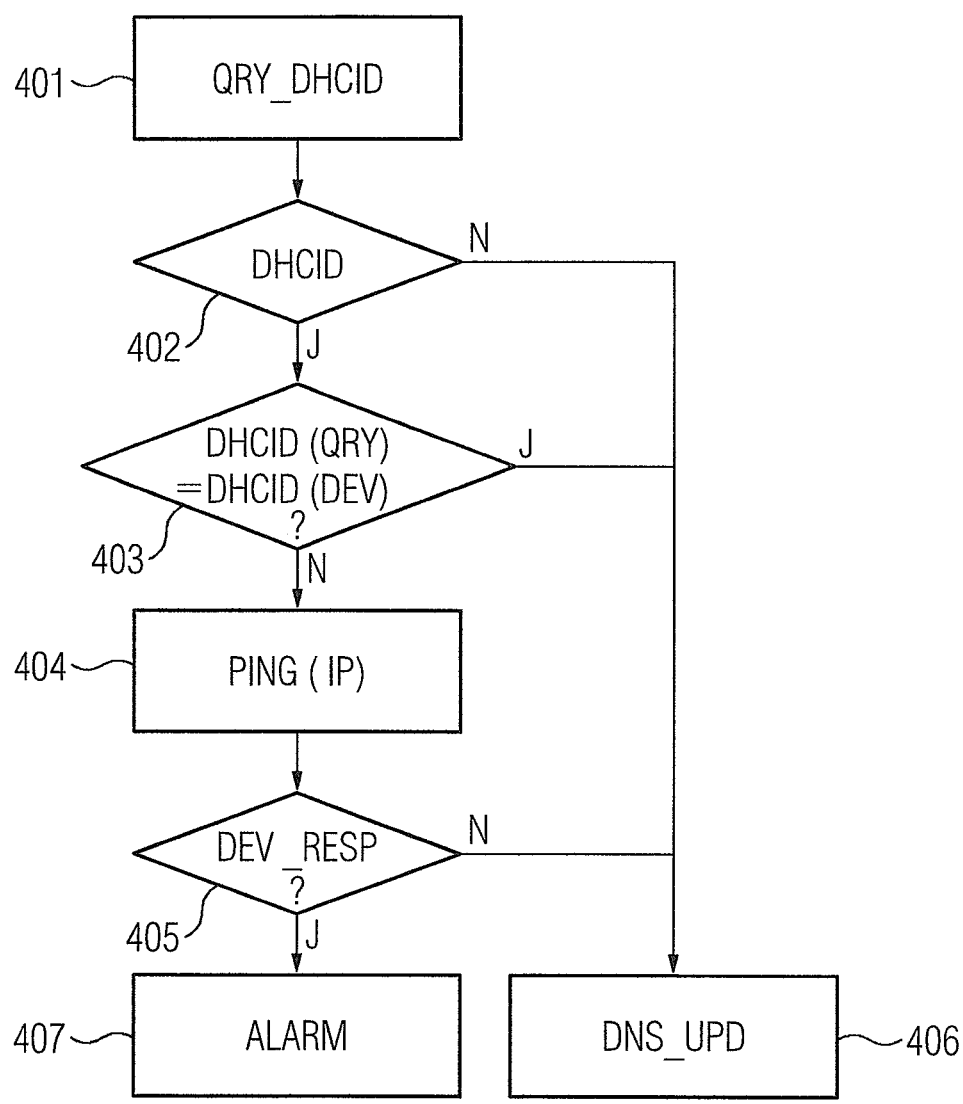
FIG. 2 shows a flowchart for registering new or changed device names or addresses in a domain name system in accordance with the invention

A control component 222, 232 is respectively assigned to the DNS Update Clients 221, 231 and enables or blocks transmission of a DNS Update Request. According to step 401 of the flow chart illustrated in FIG. 2, before enabling or blocking a DNS Update Request for a selected automation device 202, 203, the control components 222, 232 each query which device configuration identifier is assigned to the device name of the respective selected automation device 202-203 in the DNS server 104. The device configuration identifiers are generated within an address, name or name service configuration and, in the present exemplary embodiment, are Dynamic Host Configuration Identifiers (DHCID) according to IETF RFC 4701.

According to step 402, the control components 222, 232 determine whether there is actually an assignment of a device configuration identifier. If this is not the case, initial start-up is present, and transmission of a DNS Update Request is enabled by the respective control component 222, 232 according to step 406. This prompts registration of the assignment between the device name and the communication network address of the respective automation device 202, 203 in the DNS server 104.

In contrast, if an assignment exists, the control components 222, 232 check, according to step 403, whether the device configuration identifier assigned to the device name of the respective selected automation device 202, 203 in the DNS server 104 corresponds to a device configuration identifier assigned to the respective selected automation device 202-203. If this is the case, an address change or a device relocation to another cell is present, and transmission of a DNS Update Request is enabled by the respective control component 222, 232 according to step 406. This prompts registration of at least one updated communication network address of the respective automation device 202, 203 in the DNS server 104.

If the device configuration identifiers do not correspond, then the control components 222, 232 each perform a reachability check for at least one communication network address assigned to the respective device name in the DNS server 104, according to step 404. The reachability check is preferably performed via an echo request or ping in accordance with the Internet Control Message Protocol (ICMP) or the Internet Control Message Protocol for the Internet Protocol Version 6 (ICMPv6). In this case, it should be ensured that the firewall systems 206 of the cells 200 are configured accordingly.

In step 405, the control components 222, 232 assess whether an automation device 202, 203 can be reached via a ping and responds to the ping. If this is not the case, there is a replacement of a previously used automation device with a replacement automation device having an identical device name, and transmission of a DNS Update Request is enabled by the respective control component 222, 232, according to step 406. Accordingly, registration of at least one updated communication network address of the respective automation device in the DNS server 104 is prompted via the DNS Update Request.

If an automation device 202, 203 can be reached via a ping or if there is a response to an echo request, then there is multiple parallel use of an identical device name, and transmission of the DNS Update Request is blocked by the respective control component 222, 232, according to step 407. In the present exemplary embodiment, a warning of a multiply assigned device name is additionally signaled in step 407.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for registering device names assigned to industrial automation devices or communication devices in a name service system comprising at least one name service server which provides information relating to assignments between device names and communication network addresses in accordance with a name resolution protocol, at least selected automation or communication devices each comprising a name service component and, via their name service component, controlling transmission of a registration request containing an assignment between their respectively assigned device name and at least one respectively configured communication network address to the name service server, a control component being respectively assigned to the name service components and enabling or blocking transmission of a registration request, the method comprising:

querying, by each control component, which device configuration identifier is assigned to the device name of a respective selected automation or communication device in the name service system before enabling or blocking a registration request for the respective selected automation or communication device;

checking, by each control component, when an assignment exists, whether the device configuration identifier assigned to the device name of the respective selected automation or communication device in the name service system corresponds to a device configuration identifier assigned to the respective selected automation or communication device;

enabling, by each control component, transmission of the registration request when an assignment of a device configuration identifier is at least one of (i) missing and (ii) in an event of a positive checking result; and blocking, by each control component, in an event of a negative checking result, transmission of the registration request based on a reachability check for at least one communication network address assigned to the respective device name in the name service system.

2. The method as claimed in claim 1, wherein each control component blocks transmission of the registration request when an automation or communication device having the communication network address assigned to the respective device name is reachable.

3. The method as claimed in claim 2, wherein each control component signals a warning of a multiply assigned device name when an automation or communication device having the communication network address assigned to the respective device name is reachable.

4. The method as claimed in claim 2, wherein each control component enables transmission of the registration request when an automation or communication device having the communication network address assigned to the respective device name is unreachable.

5. The method as claimed in claim 3, wherein each control component enables transmission of the registration request when an automation or communication device having the communication network address assigned to the respective device name is unreachable.

6. The method as claimed in claim 1, wherein the reachability check is performed via an echo request in accordance with at least one of an Internet Control Message Protocol and an Internet Control Message Protocol for Internet Protocol Version 6.

7. The method as claimed in claim 1, wherein registration of the assignment between the device name and the communication network address of the respective automation or communication device in the name service system is prompted by means of the registration request when an assignment of a device configuration identifier is missing.

8. The method as claimed in claim 1, wherein registration of at least one updated communication network address of the respective automation or communication device in the name service system is prompted by means of the registration request when at least one of an event of a positive checking result and when an automation or communication device having the communication network address assigned to the respective device name is unreachable.

9. The method as claimed in claim 1, wherein the name service components each comprise a name service client for dynamic DNS; and wherein the selected automation or communication devices each transmit registration requests via their name service client for dynamic Domain Name System (DNS).

10. The method as claimed in claim 1, wherein a configuration server for at least one of (i) address, (ii) name and (iii) name service configuration is respectively assigned to the selected automation or communication devices; and wherein registration requests for the selected automation or communication devices are respectively transmitted via the assigned configuration server.

11. The method as claimed in claim 10, wherein the selected automation or communication devices each control transmission of a registration request by the assigned configuration server using their name service component.

12. The method as claimed in claim 10, wherein the respectively assigned configuration server is at least one of (i) a Dynamic Host Configuration Protocol (DHCP) server and (ii) a DHCPv6 server.

13. The method as claimed in claim 11, wherein the respectively assigned configuration server is at least one of (i) a Dynamic Host Configuration Protocol (DHCP) server and (ii) a DHCPv6 server.

14. The method as claimed in claim 12, wherein the selected automation or communication devices are assigned to an industrial automation or communication system having a plurality of at least one of (i) DHCP servers and (ii) DHCPv6 servers.

15. The method as claimed in claim 1, wherein the device names are Fully Qualified Domain Names.

16. The method as claimed in claim 1, wherein the name service server provides information relating to assignments between device names and communication network addresses according to Internet Engineering Task Force (IETF), Request for Comments (RFC) 1034 and IETF RFC 1035; and wherein the registration requests are Domain Name System (DNS) Update Requests.

17. The method as claimed in claim 1, wherein the device configuration identifiers are generated within at least one of (i) an address, (ii) name and (iii) name service configuration, and the device configuration identifiers are Dynamic Host Configuration Identifiers in accordance with Internet Engineering Task Force (IETF), Request for Comments (RFC) 4701.

18. A control component comprising:

a processor; and memory;

wherein the control component is set up and configured to:

enable or block transmission of a registration request to a name service server of a name service system, said transmission being controlled by a name service component of a selected automation or communication device, the registration request comprising an assignment between a device name and at least one configured communication network address of the selected automation or communication device;

query which device configuration identifier is assigned to the device name of the selected automation or communication device in the name service system before enabling or blocking a registration request for a selected automation or communication device;

check, when an assignment exists, whether the device configuration identifier assigned to the device name of the selected automation or communication device in the name service system corresponds to a device configuration identifier assigned to the selected automation or communication device;
enable transmission of the registration request when an assignment of a device configuration identifier is at least one of (i) missing and (ii) in an event of a positive checking result;
block, in an event of a negative checking result, transmission of the registration request based on a reachability check for at least one communication network address assigned to the respective device name in the name service system.

* * * * *